US006534141B1

(12) United States Patent
Hull, Jr. et al.

(10) Patent No.: US 6,534,141 B1
(45) Date of Patent: Mar. 18, 2003

(54) METHOD OF FORMING AN IMPROVED SUPPORT MEMBER FOR A FABRIC AND FILM FORMING DEVICE

(76) Inventors: Raymond J. Hull, Jr., 408 Rick Rd., Hampton, NJ (US) 08827; William A. James, 551 Scotch Rd. West, Pennington, NJ (US) 08534

( * ) Notice: Subject to any disclaimer, the term of this patent is extended or adjusted under 35 U.S.C. 154(b) by 0 days.

(21) Appl. No.: 09/420,721

(22) Filed: Oct. 20, 1999

Related U.S. Application Data

(60) Provisional application No. 60/106,061, filed on Oct. 27, 1998.

(51) Int. Cl.[7] .......................... B29D 22/00; B29D 23/00

(52) U.S. Cl. ...................................... 428/36.9; 428/131

(58) Field of Search ................................ 428/36.9, 131

(56) References Cited

U.S. PATENT DOCUMENTS 5,508,368 A * 4/1996 Knapp et al. ............... 427/534

5,827,597 A * 10/1998 James et al. ................ 428/131

* cited by examiner

*Primary Examiner*—Mark L. Bell
*Assistant Examiner*—Shalie A. Manlove

(57) ABSTRACT

The present invention is directed to a topographical support member which is useful for-producing nonwoven fabrics or apertured plastic films. The topographical support member is a rotatable hollow cylindrical tube having a substantially smooth surface and plurality of apertures therethrough. A substantial portion of the surface of the topographical support member has an ion beam deposited coating, the coating being highly adherent and exhibiting improved wear resistance relative to uncoated topographical support surfaces. The coating layer is deposited on the support member by a beam of ions containing two or more of the elements of C, Si, H, O, or N.

2 Claims, 3 Drawing Sheets

METHOD OF FORMING AN IMPROVED SUPPORT MEMBER FOR A FABRIC AND FILM FORMING DEVICE

This application claims the benefit of No. 60/106,061, filed Oct. 27, 1998.

FIELD OF THE INVENTION

This invention relates to a process for making a smooth, abrasion-resistant, nonstick, topographical support surface for a fabric and film forming device.

BACKGROUND OF THE INVENTION

Nonwoven fabrics have been known for many years. In one process for producing nonwoven fabrics, a fiber batt or web is treated with streams or water, air, or other fluid to cause the fibers to entangle with each other and provide some strength in the batt. Many methods have been developed for treating fiber batts in this manner in an attempt to duplicate the physical properties and appearance of woven fabrics. Similarly, solid polymeric films may be treated by streams of water, air, or other fluid to create apertures in the film to allow for the passage of air or liquids through the film and to allow it to be used in a fashion similar to that of a nonwoven. Common uses for such apertured polymeric films include body-facing cover sheets for disposable absorbent articles, such as diapers, sanitary napkins, tampons, incontinence articles, and other absorbent articles.

U.S. Pat. Nos. 5,098,764 and 5,244,711 disclose backing members for supporting a fibrous web during the manufacture of nonwoven fabrics. The support members disclosed in U.S. Pat. No. 5,098,764 have a predetermined topography as well as a predetermined pattern of openings within that topography. In one specific embodiment, the backing member is three-dimensional and includes a plurality of pyramids disposed in a pattern over one surface of the backing member. This specific backing member further includes a plurality of openings which are disposed in the spaces, referred to as "valleys", between the aforementioned pyramids. In this process, a starting web of fiber is positioned on the topographical support member. The support member with the fibrous web thereon is passed under jets of high pressure fluid, typically water. The jets of water cause the fiber to intertwine and interentangle with each other in a particular pattern, based on the topographical configuration of the support member.

The pattern of topographical features and apertures in the support member is critical to the structure of the resulting nonwoven fabric. In addition, the support member must have sufficient structural integrity and strength to support a fibrous web while fluid jets rearrange the fibers and entangle them in their new arrangement to provide a stable fabric. The support member must not undergo any substantial distortion under the force of the fluid jets. Also, the support member must have means for removing the relatively large volumes of entangling fluid so as to prevent "flooding" of the fibrous web, which would interfere with effective entangling. Typically, the support member includes drainage apertures which must be of a sufficiently small size to maintain the integrity of the fibrous web and prevent the loss of fiber through the forming surface. When the entangling fluid is air, and specifically, heated air, the forming surface must be resistant to the effects of the heated air; i.e., the forming surface must not melt or otherwise change form when subjected to the heated air. The forming surface should also be resistant to sticking of the fibrous web when heated air is used. In addition, the support member should be substantially free of burrs, hooks or the like irregularities that could interfere with the removal therefrom of the entangled fabric. At the same time, the support member must be such that fibers of the fibrous web being processed thereon are not washed away under the influence of the fluid jets.

Similarly, when the substrate to be treated by the streams of fluid or air is a polymeric film, the film may tend to stick to the forming surface, especially if the treating fluid is hot air or if the forming surface has any burrs, hooks, or other irregularities on its surface. The forming surface must thus be made with a very smooth surface to allow the apertured film to be drawn off easily and quickly during the forming process. Even when the apertured film does not stick to the forming surface, the process of heating the film may cause tiny amounts of polymer to be released from the film and stick to the forming surface. The tiny amounts of polymer may, over time, build up to create deposits of polymer on the forming surface. These deposits may alter the forming surface such that it is no longer usable. The forming surface should be easily cleanable so that the deposits can be easily and economically removed so that the forming surface may simply be cleaned and need not be replaced.

While machining may be used to fabricate such topographical support members, such a method of manufacture is extremely expensive and often results in aforementioned burrs, hooks and irregularities. Thus, there is a need for a method for making topographical support members which method is less expensive, reduces the numbers of burrs, hooks and irregularities therein, and produces a forming member with a surface which resists the formation of polymer deposits from the forming process, and which may be easily cleaned of such deposits.

SUMMARY OF THE INVENTION

This invention is directed to a method of forming an improved surface on a topographical support member for producing nonwoven fabrics and apertured films. More particularly, this invention provides an ion beam deposited coating to the surface of a topographical support member such that the coating is highly adherent and exhibits greatly improved wear resistance and environmental durability over a similar topographical support member without the coating.

Topographical support members may be fashioned with a very simple or a very intricate topographical pattern. Highly complex topographical surface patterns may be produced on the support member by engraving the-surface with a laser beam. When these support members with complex patterns are used to form apertured films or fabrics, the repetition of the aperturing process often causes a build-up of polymer from the film or fabric as it is being apertured on the surface of the support member as a by-product of the process. It has been found that even small amounts of polymer build-up interferes with the aperturing process and disrupts the desired pattern of the surface resulting in an inferior or unacceptable film or fabric product. Therefore, it was thought that any attempt to coat the topographical patterned surface would likewise distort or interrupt the pattern, making the topographical support member unsuitable for use.

Surprisingly, it has been found that the coatings made by the process of this invention do not distort the pattern of the support member surface, and that, in fact, the support member surface is actually enhanced by the coating. The coated surfaces of the invention not only resist the abrasive forces of normal wear, they resist polymer build-up which normally results from the aperturing process and are more easily cleaned when minor polymer build-up is experienced.

In accordance with the method of the present invention, a laser beam is directed onto a workpiece to be engraved with a topographical pattern. The laser beam is focused such that the focal point of the beam is below the top surface of the workpiece. The focusing of the laser beam at a point other than the top surface of the workpiece, e.g. at a point below the top surface, instead of on the surface is termed "defocusing." Thereafter, the defocused laser beam is used to drill a predetermined pattern of apertures in the workpiece. The defocused laser beam may also be used to form a topographical array of peaks and valleys surrounding at least some and preferably surrounding each aperture of the workpiece. The apertures may have substantially straight, parallel side walls or alternatively may have a tapered or conical-like top portion angled such that the major diameter of the aperture resides on the top surface of the resulting support member. The topographical array of peaks and valleys is formed by the center line to center line spacing of adjacent apertures being less than the major diameter of the top portion of the apertures. Such a spacing results in the taper of adjacent apertures intersecting within the starting thickness of the workpiece. The workpiece is then chemically cleaned to remove unwanted materials and other contaminants. Next, the workpiece is inserted into a vacuum chamber, the air in said chamber is evacuated and the workpiece surface is sputter-etched by a beam of energetic ions to assist in the removal of residual contaminants such as residual hydrocarbons and surface oxides, and to activate the surface. After the workpiece surface has been sputter-etched, a protective, abrasion-resistant coating is deposited using selected precursor gases by ion beam deposition. The ion beam-deposited coating may contain one or more layers. Once the chosen thickness of the coating has been achieved, the deposition process on the workpiece is terminated, the vacuum chamber pressure is increased to atmospheric pressure, and the coated workpieces having improved abrasion-resistance are removed from the vacuum chamber.

The present invention provides amorphous, conformal, protective, abrasion-resistant coats containing a combination of the elements selected from the group consisting of C, Si, H, O and N. More particularly, the coatings of the present invention are selected from at least one of the following combinations of elements: Si and C; Si, C and H; Si and N; Si, N and H; Si and O; Si, O and H; Si, O and N; Si, O, N and H; Si, C and N; Si, C, H and N; Si, C and O; Si, C, H and O; Si, C, O and N; and Si, C, H, O and N.

The process for deposition of these coatings uses an ion beam source which operates with-precursor gases comprising at least one of the following combinations of elements selected from the group consisting of Si and C; Si, C and H; Si and N; Si, N and H; Si and O; Si, O and H; Si, O and N; Si, O, N and H; Si, C and N; Si, C, H and N; Si, C and O; Si, C, H and O; Si, C, O and N; and Si, C, H, O and N. The process of the present invention is particularly well-suited to the manufacture of optically transparent coatings with tailored hardness, stress, and chemistry. These properties make the coatings of the present invention ideally suited to plastic substrates or workpieces, such as topographical forming surfaces for apertured films or nonwoven fabrics. Coatings which exhibit glass-like or quartz-like properties can be made by the present process. Coatings which have properties resembling silicon carbide, silicon nitride, and hydrogenated and oxygenated forms of these materials can also be made by this process.

Additionally, diamond-like carbon coatings can be made by the process of the present invention. The term "diamond-like carbon" is meant to include amorphous materials composed of carbon and hydrogen, whose properties resemble, but do not duplicate, those of diamond. Some of these properties are high hardness (HV=about 1,000 to about 5,000 kg/mm$^2$), low friction coefficient (approximately 0.1), transparency across the majority of the electromagnetic spectrum, and chemical inertness. At least some of the carbon atoms in DLC are bonded in chemical structures similar to that of diamond, but without long range crystal order. These DLC materials can contain to 50 atomic percent of hydrogen. The DLC coatings made by the present invention are hard, inert and slippery, and are ideal for use in many applications.

The coatings of the invention may range from about 50 Å to about 100 microns thick, depending upon the degree of abrasion resistance desired and upon the complexity and size of the forming member surface pattern. In general, the more complex the pattern, and the smaller the peaks and valleys of the forming member surface topography, the thinner the coating will need to be to avoid distortion of the surface pattern. Additionally, multiple layers of coatings may be provided, with each coating varying in thickness. For cases where a diamond-like carbon coating is required, it is preferred to deposit an interlayer material, or adhesion-promoting layer containing silicon atoms onto the substrate before deposition of the diamond-like carbon coating layer to ensure good adherence of the coating. Typically, the interlayer thickness is on the order of from 10 Å to 1 micron.

DETAILED DESCRIPTION OF THE INVENTION

Figure 1:
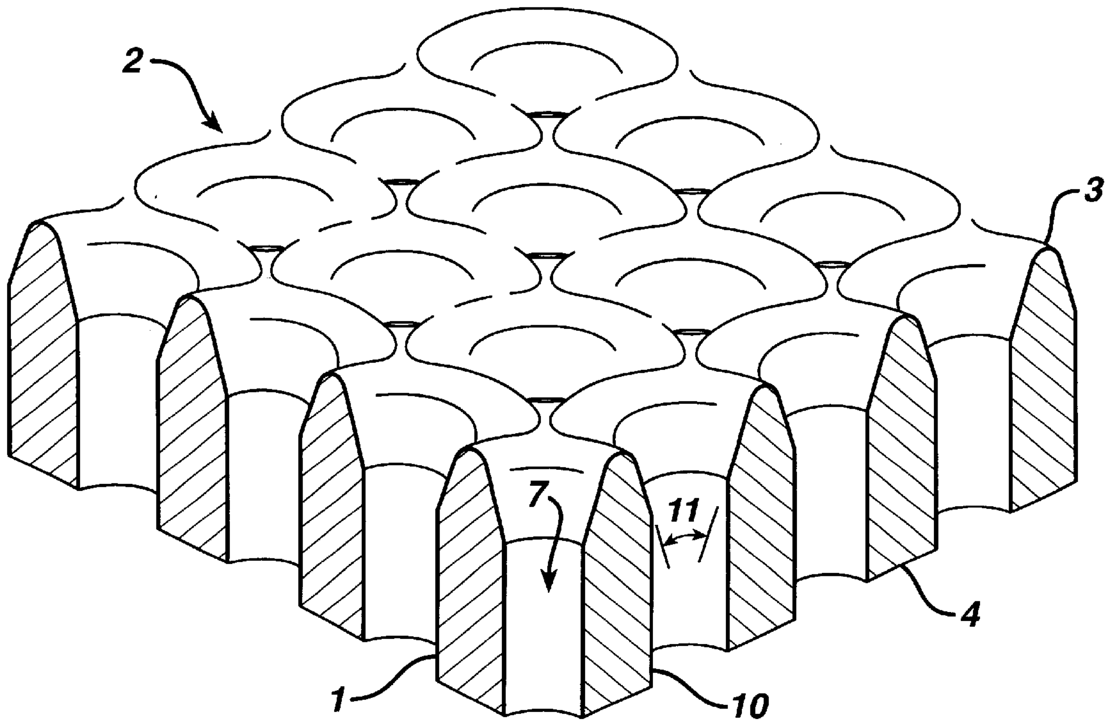
FIG. 1 is a perspective view of one type of topographical support member of the present invention.

The present invention is directed to a novel topographical support member which is useful for producing nonwoven fabrics and apertured plastic films-and is shown in FIG. 1. The support member 2 comprises a body 1 having a top surface 3 and a bottom surface 4. A plurality of apertures 7 extend through the thickness of the support member 2 and are disposed in a predetermined pattern such as the pattern illustrated in FIG. 3. As can be seen in FIG. 1, the surface of the support member has a thin, amorphous, conformal, protective, abrasion resistant coating 10 which extends over the entire top surface s and substantially covers the walls of the apertures 7.

The starting material for the support member 2 may be any desired shape or composition and is preferably a plastic composite is material in the form of a cylindrical tube. The topographical support member preferably comprises acetal; acrylic will also perform satisfactorily. In addition, the preferred shape of the starting material is a thin wall, cylindrical, preferably seamless, tube that has been relieved of residual internal stresses. As will be described later, the cylindrical shape accommodates the preferred apparatus for producing the nonwoven fabrics.

Topographical support members in the form of tubes manufactured to date for use in forming support members are generally 2 to 6 feet in diameter and have a length ranging from about 2 to 16 feet. The wall thickness is nominally ¼ inch. These sizes are a matter of design choice. A starting blank tubular workpiece is mounted on an appropriate arbor, or mandrel 21 that fixes it in a cylindrical shape and allows rotation about its longitudinal axis in bearings 22. A rotational drive 23 is provided to rotate mandrel 21 at a controlled rate. Rotational pulse generator 24 is connected to and monitors rotation of mandrel 21 so that its precise radial position is known at all times.

Parallel to and mounted outside the swing of mandrel 21 is one or more guide ways 25 that allow carriage 26 to traverse the entire length of mandrel 21 while maintaining a constant clearance to the top surface 3 of tube 2. Carriage drive 33 moves the carriage along guide ways 25, while carriage pulse generator 34 notes the lateral position of the carriage with respect to support member 2. Mounted on the carriage is focusing stage 27. Focusing stage 27 is mounted in focus guide ways 28 and allows motion orthogonal to that of carriage 26 and provides a means of focusing lens 29 relative to top surface 3. Focus drive 32 is provided to position the focusing stage 27 and provide the focusing of lens 29.

Secured to focusing stage 27 is the lens 29, which is secured in nozzle 30. Nozzle 30 has means 31 for introducing a pressurized gas into nozzle 30 for cooling and maintaining cleanliness of lens 29. Also mounted on the carriage 26 is final bending mirror 35, which directs the laser beam 36 to the focusing lens 29. Remotely located is the laser 37, with optional beam bending mirrors 38 to direct the beam to final beam bending mirror 35. While it would be possible to mount the laser 37 directly on carriage 26 and eliminate the beam bending mirrors, space limitations and utility connections to the laser make remote mounting far preferable.

When the laser 37 is powered, the beam 36 emitted is reflected first off beam bending mirror 38, then final beam bending mirror 35, which directs it to lens 29. The path of laser beam 36 is configured such that, if lens 29 were removed, the beam would pass through the longitudinal center line of mandrel 21. With lens 29 in position, the beam is focused below, but near the top surface 3. Focusing the beam below the top surface is identified as “defocusing” the laser beam relative to the surface of the tube.

While this invention could be used with a variety of lasers, the preferred laser is a fast flow $CO_2$ laser, capable of producing a beam rated at up to 2500 watts. This process is in no way dependent on such a high power laser, as support surfaces have been successfully drilled with a slow flow $CO_2$ laser rated at 50 watts.

When focusing lens 29 passes beam 36, it concentrates the energy near the center of the beam. The rays are not bent through a single point, but rather a spot of small diameter. The point of smallest diameter is said to be the focus or focal point. This occurs at a distance from the lens said to be the focal length. At lengths either shorter or greater than the focal length, measured spot sizes will be greater than the minimum.

The sensitivity to focus position is inversely proportional to focal length. Minimum spot size is directly proportional to focal length. Therefore, a short focal length lens can achieve a smaller spot size but must be more accurately positioned and is affected dramatically by surface run-out. Longer focal length lenses are more forgiving of target positioning, but can only achieve somewhat larger spot sizes. Thus, in addition to the power distribution contributing to the tapered top portion of the drilled aperture, the defocusing of the beam below the surface also contributes to the angle and length of the taper, and hence the shape and size of the peaks and valleys.

In order to fabricate a support member, an initial focusing step must be performed. Once a blank tubular workpiece 12 is positioned on the mandrel 21, the laser is pulsed briefly and the mandrel rotated slightly between pulses such that a series of small depressions is produced. The focus stage 27 is then moved with respect to the mandrel center line to change the focus position and another series of depressions is produced. Typically a matrix of 20 rows of 20 depressions each is drilled. The depressions are examined microscopically, and the column of smallest depressions identified. This is established as the reference diameter for top surface 3 of the blank tubular workpiece at which the beam was focused.

Figure 3:
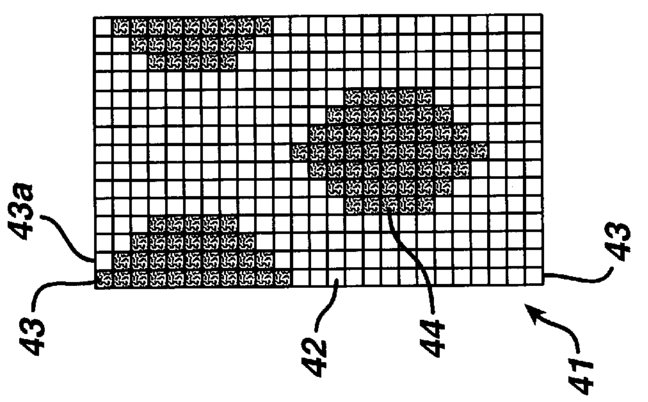
FIG. 3 is a bit map of the laser instructions defining a pattern of apertures to be drilled in a workpiece to form the topographical support member of FIG. 1 and depicts the smallest rectangular repeat element, 25 pixels long and 15 pixels wide of the aperture pattern.

A desired pattern is selected, such as the one shown in FIG. 3. The pattern is examined to-determine the number of repeats that will be required to cover the circumference of the workpiece and complete the surface without an-obvious seam. Similarly, the advance along the longitudinal axis of the tubular workpiece per repeat and total number of repeats is established. These data are entered into a computer control for operating the laser drilling machine.

In operation, the mandrel, with the blank tubular workpiece 12 mounted thereon, is rotated in front of the lens. The carriage is motored so that the first aperture position corresponds with the focal point of the lens 29. The focus stage is motored inward, placing the focal point inside the interior of the material to be drilled. The laser is then pulsed, with some combination of pulse power level and duration. As seen in FIG. 1, the diameter of the aperture at the top surface 3 may be considerably larger than the diameter of the aperture at the lower surface 4. In order to achieve the desired topographical configuration, two factors need to be measured and controlled. First, to the degree with which the lens is focused into the interior of the workpiece increases the cone angle 11, and second, increasing the power level or pulse duration increases the depth and diameter. Once an aperture of the proper diameter and taper is achieved, the rotational drive and carriage drive can be indexed to reposition the support member such that the next intended hole position corresponds to the focal point. The process is then repeated until the entire pattern has been drilled. This technique is known as “percussion” drilling.

If the laser selected is of sufficient power, the mandrel and carriage do not need to be stopped during the laser pulse. The pulse can be of such short duration that any movement of the workpiece during the drilling process is inconsequential. This is known in the trade as “fire-on-the-fly” drilling.

If the laser can recover rapidly enough, the workpiece can be rotated at a fixed speed and the laser pulsed once to create each hole. In a pattern such as the one shown in FIG. 3, the laser would normally be pulsed to produce a complete column, the carriage indexed to the next column position and the beam pulsed for the next series of apertures.

One problem that may occur depending on the type of material and density of the pattern of apertures, is the introduction of a large amount of heat into a small area of the forming surface. Gross distortion, and the loss of pattern registration may result. Under some conditions, major dimensional changes of the part results, and the surface is neither cylindrical nor the right size. In extreme cases, the tube may crack. A preferred embodiment of the present invention, which eliminates this problem, uses a process called defocused raster scan drilling.

In this approach, the pattern is reduced to the smallest rectangular repeat element 41 as depicted in FIG. 3. This repeat element contains all of the information required to produce the pattern in FIG. 3. When used like a tile and placed both end-to-end and side-by-side, the larger pattern is the result.

This repeat element is further divided into a grid of smaller rectangular units or "pixels" 42. Though typically square, for some purposes, it is more convenient to employ pixels of unequal proportions.

Each column of pixels represents one pass of the workpiece past the focal position of the laser. This column is repeated as many times as is required to reach completely around blank support member 12. Each pixel where the laser is intended to create a hole is black. Those pixels where the laser is turned off are white.

Figure 2:
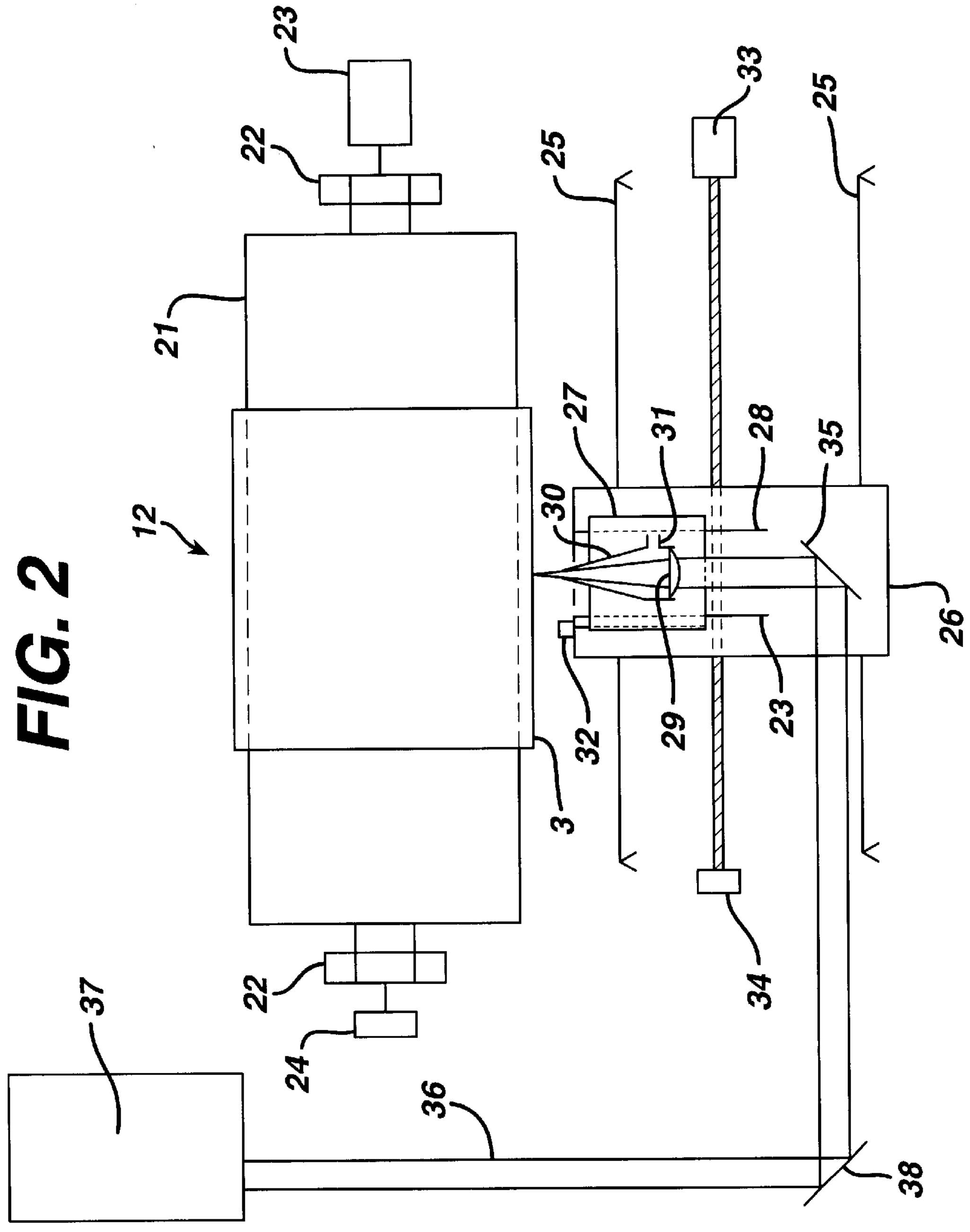
FIG. 2 is a diagrammatic view of an apparatus for forming a topographical support member of the present invention.

To begin drilling at the top of the first column of pixels in FIG. 3, while the mandrel is turning at a fixed rate, the laser is turned on, maintained at a constant power level for 11 pixels and then switched off. These pixels are counted by the rotational pulse generator 24 in FIG. 2. The laser remains off for the next 14 units. This laser off/on sequence is repeated for the first revolution, at which point the mandrel is back to starting position, carriage drive 33 has repositioned the carriage one unit and the computer is ready to do column 43*a*.

During column number 43*a*, the laser has a shorter "on time" (now 9 units) and longer "off time" (now 16 units). The total number of on and off times is a constant based on the pattern height.

This process is repeated until all of the columns have been used over an entire revolution each; in the case of FIG. 3, there were 15 revolutions of the mandrel. At this point, the process returns to the instructions in column 43.

Note that in this approach, each pass produces a number of narrow cuts in the material, rather than a large hole. Because these cuts are precisely registered to line up side-by-side and overlap somewhat, the cumulative effect is a hole. In the pattern of FIG. 3, each hexagonal hole 44 actually requires 7 passes separated by a complete revolution, distributing the energy around the tube and minimizing local heating.

If, during this drilling operation, the lens was focused at the top surface of the material, the result would be hexagonal holes with reasonably parallel walls. The combination of raster scan drilling with the defocused lens approach, however, produces the forming surface of FIG. 1. In the present invention, the apertures 7 are quite small and numerous. Typical patterns range from 800 to 1400 apertures per square inch.

The process to manufacture a nonwoven fabric using a support member of the present invention has been described in U.S. Pat. Nos. 5,098,764 and 5,244,711, both of which are incorporated by reference herein. The process to manufacture an apertured film using a support member of the present invention has been described in U.S. Pat. Nos. 5,770,144 and 5,567,376, both of which are incorporated by reference herein.

The support member of the present invention is coated with a very thin, amorphous, conformal, protective, abrasion-resistant coating to provide a hard, chemically inert, low-friction surface. Coatings of this type may be applied by single and dual ion beam processes to produce diamond-like coating processes. In the ion beam process, a mixture of hydrocarbon and argon is supplied to an ion source to produce a plasma. Electrically charged grids at one end of the ion source extract the ions and accelerate them toward the substrate to be coated. The surface being coated remains near ambient temperature because it is removed from the energetic plasma within the ion source. The accelerated carbon and hydrocarbon ions combine on the surface being coated to produce a diamond-like coating, which has the chemical and physical properties similar to diamond, but without long-range crystalline order. Other coatings and processes for applying the coatings are described in U.S. Pat. Nos. 5,268,217, 5,508,368, and 5,618,619, incorporated herein by reference.

Figure 4:
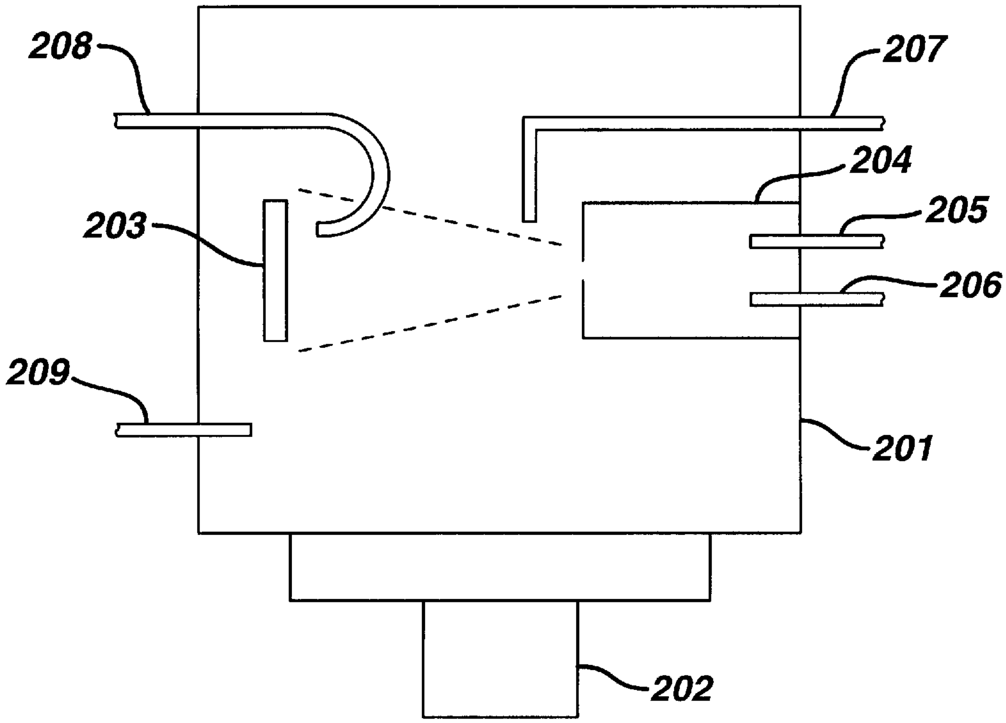
FIG. 4 is a diagrammatic view of an illustrative ion beam deposition apparatus used to manufacture coated substrate products in accordance with the present invention.
Figure 5:
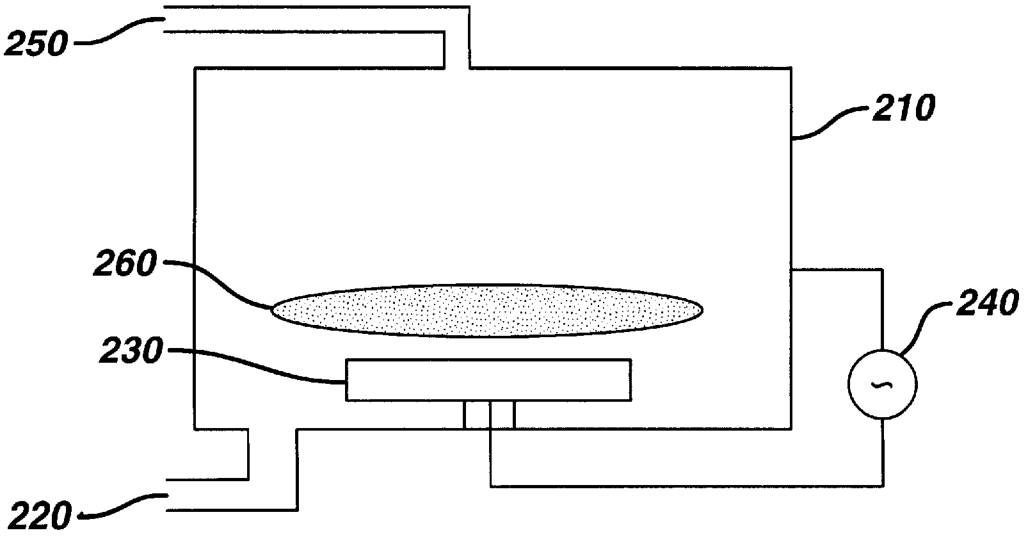
FIG. 5 is a diagrammatic view of an illustrative radio frequency plasma deposition apparatus used to manufacture coated substrate products in accordance with the present invention.

The preferred apparatus for carrying out the workpiece coating process of the preferred embodiment of the present invention is illustrated schematically in FIGS. 4 and 5. Referring to FIG. 4, the coating process is carried out inside a high vacuum chamber 201, which is fabricated according to techniques known in the art. Vacuum chamber 201 is evacuated into the high vacuum region by first pumping with a rough vacuum pump (not shown) and then by a high vacuum pump, 202. Pump 202 can be a diffusion pump, turbomolecular pump, cryogenic pump ("cryopump"), or other high vacuum pumps known in the art. Use of a diffusion pump with a cryogenically cooled coil for pumping water vapor is a preferred high vacuum pumping arrangement for the present invention. The use of cryopumps with carbon adsorbents is somewhat less advantageous than other high vacuum pumps because such cryopumps have a low capacity for hydrogen which is generated by the ion beam sources used in the method of the present invention. The low capacity for hydrogen results in the need to frequently regenerate the adsorbent in the cryopumps.

As an alternative to the ion beam apparatus illustrated in FIG. 4, an ion assisted plasma deposition apparatus as illustrated in FIG. 5 may be used. The coating is carried out in Vacuum chamber 210, which is fabricated according to techniques known in the art. Vacuum chamber 210 is evacuated using the vacuum pumping port 220 which is connected to a vacuum pump (bot shown). In the apparatus shown, the substrate rests directly on a biased electrode 230, which is connected to the active output of a radio frequency power supply 240, while an additional electrode (not shown) and or the walls of the grounded chamber 210 are part of the return circuit.

Prior to coating by plasma deposition, the substrates are etched with energetic ions and/or reactive species produced in plasma 260. The plasma is usually produced using an inert gas or a reactive gas (e.g. hydrogen or oxygen) depending on the substrate to be coated. The gases used for the etching step are introduced through a gas introduction system 250.

It is understood that the process of the present invention can be carried out in a batch-type vacuum deposition system, in which the main vacuum chamber is evacuated and vented to atmosphere after processing each batch of parts; a load-locked deposition system, in which the main vacuum deposition chamber is maintained under vacuum at all times, but batches of parts to be coated are shuttled in and out of the deposition zone through vacuum-to-air load locks; or inline processing vacuum deposition chambers, in which parts are flowed constantly from atmosphere, through differential pumping zones, into the deposition chamber, back through differential pumping zones, and returned to atmospheric pressure.

Referring to FIG. 4, substrates or workpieces to be coated are mounted on substrate holder 203, which may incorporate tilt, simple rotation, planetary motion, or combinations thereof. The substrate holder can be in the vertical or horizontal orientation, or at any angle in between. Vertical orientation is preferred to minimize particulate contamination of the substrates, but if special precautions such as low turbulence vacuum pumping and careful chamber maintenance are practiced, the substrates can be mounted in the horizontal position and held in place by gravity. This horizontal mounting is advantageous from the point of view of easy fixturing of small substrates which are not easily clamped in place. This horizontal geometry can be most easily visualized by rotating the illustration in FIG. 4 by 90 degrees.

Prior to deposition, the substrates are ion beam sputter-etched with an energetic ion beam generated by ion beam source 204. Ion beam source 204 can be any ion source known in the prior art, including Kaufman-type direct current discharge ion sources, radio frequency or microwave frequency plasma discharge ion sources, microwave electron cyclotron resonance ion sources, each having one, two, or three grids, or gridless ion sources such as the Hall Accelerator and End Hall ion source of U.S. Pat. No. 4,862,032; the description of which is incorporated by reference herein. The ion source beam is charge neutralized by introduction of electrons into the beam using a neutralizer (not shown), which may be a thermionic filament, plasma bridge, hollow cathode, or other types known in the prior art.

Ion source 204 is provided with inlets 205 and 206 for introduction of gases directly into the ion source plasma chamber within ion source 204. Inlet 205 is used for introduction of inert gases, such as argon, krypton, and xenon, for the sputter-etching. Additionally, during the sputter-etching step, oxygen may be introduced in inlet 206, and used independently or mixed with an inert gas to provide chemically-assisted sputter-etching, e.g. for plastic substrates. Inlet 206 is used for introduction of reactive gases such as hydrocarbons (e.g. methane, acetylene, cyclohexane), siloxanes, silazanes, oxygen, nitrogen, hydrogen, ammonia, and similar gases for the coating deposition. During the coating deposition, the reactive gases can be mixed with an inert gas to modify the properties of the resultant coating and improve the stability of the ion source. The reactive gases can also be introduced away from the ion source plasma chamber, but into the ion beam by inlet 207. Inlet 207 may contain multiple holes for the introduction of reactive gases, or may be a "gas distribution ring". Finally, reactive gases for the deposition, e.g. oxygen and ammonia, can be introduced at or near the substrate by inlet 208, or into the chamber background by inlet 209. The reactive gases introduced by inlet 208 modify the properties of the coating by chemical reaction at the surface of the coating during deposition.

Additionally, to improve the deposition rate and throughput of the coating machine, multiple ion sources 204 can be utilized and operated simultaneously. Operation of the ion sources can be sequenced for the case in which different coating materials are deposited from each ion source. As described in U.S. Pat. No. 4,490,229, an additional ion source (not shown) can be used to co-bombard the substrates during coating deposition to alter the film properties.

According to the method of the present invention, the substrate is first chemically cleaned to remove contaminants, such as residual hydrocarbons and other contaminants, from the substrate manufacturing and handling processes. Ultrasonic cleaning in solvents, or other aqueous detergents as known in the art is effective. Details of the cleaning procedure depend upon the nature of the contamination and residue remaining on the part after manufacture and subsequent handling. It has been found that it is critical for this chemical cleaning step to be effective in removing surface contaminants and residues, or the resulting adhesion of the coating will be poor.

In the second step of the process, the substrate is inserted into a vacuum chamber, and the air in said chamber is evacuated. Typically, the vacuum chamber is evacuated to a pressure of $1\times10^{-5}$ Torr or less to ensure removal of water vapor and other contaminants from the vacuum system. However, the required level of vacuum which must be attained prior to initiating the next step must be determined by experimentation. The exact level of vacuum is dependent upon the nature of the substrate material, the sputter-etching rate, the constituents present in the vacuum chamber residual gas, and the details of the coating process. It is not desirable to evacuate to lower pressures than necessary, as this slows down the process and reduces the throughput of the coating system.

In the third step of the process, the substrate surface is bombarded with a beam of energetic ions from an ion beam to assist in the removal of residual contaminants, e.g. any residual hydrocarbons, surface oxides and other contaminants, not removed in the first step, and to activate the surface. By the term "ion beam", it is intended to mean a beam of ions generated from a plasma which is remote from the substrate. The ions can be extracted from the plasma by a variety of techniques which include, but are not limited to the use of electrostatic grids which are biased to promote extraction of positive ions, e.g. Kaufman-type ion source, or magnetic fields coupled with electrostatic fields, e.g. End Hall-type ion source and Hall accelerators. After extraction, the ions are directed from the ion source toward the substrates due to the potential difference between the source of the ions (plasma) and the samples, typically at or near ground potential. The ion beam is typically charge neutralized with electrons obtained from a variety of possible sources including but not limited to a thermionic hot filament, a plasma bridge neutralizer or a hollow cathode. Charge neutralization of the ion beam allows the processing of electrically insulating substrates in a very stable fashion since the potential of the substrate is maintained. Typical pressures in the deposition zone around the substrate for the invention are in the range of about $10^{-6}$ Torr to about $5\times10^{-3}$ Torr so that ion-gas collisions can be minimized, thereby maintaining the high energy ion bombardment of the surface which is necessary for the formation of dense, hard coatings. This sputter-etching of the substrate surface is required to achieve high adhesion between the is substrate surface and the coating layer(s). The sputter-etching can be carried out with inert gases such as argon, krypton, and xenon. Additionally, hydrogen or oxygen may be added to the ion beam to assist in activation of the surface. The sputter-etching source gas a can be introduced in a variety of different ways, including direct introduction into the plasma chamber of the ion source, introduction near the ion source but not directly into the source, i.e. through inlet 207, or introduction into a location remote from the source, as the vacuum chamber background gas through inlet 209. Typically, in order to achieve efficient and rapid ion sputter-etching, the ion beam energy is greater than 20 eV. Ion energies as high as 2000 eV can be used, but ion beam energies less than 500 eV result in the least amount of atomic scale damage to the substrate.

Immediately after the substrate surface has been sputter-etched, a coating layer is deposited on the substrate by a beam of ions containing two or more of the elements of C, Si, H, O, N or subgroups of these elements. This ion beam is generated by introducing precursor gases containing two or more of the elements of C, Si, H, O, N or subgroups of these elements into the ion source plasma, near the ion source plasma, or remote from the ion source plasma. These precursor gases may be blended with other inert gases, e.g. argon. The precursor gases undergo "activation" in the ion source plasma or in the ion beam itself. Examples of "activation" include, but are not limited to simple electronic excitation, ionization, chemical reaction with other species, ions and neutrals, which may be electronically excited, and decomposition into simpler ionic or neutral species which may be electronically excited. Ions are extracted from the remote plasma to form an ion beam which is charge neutralized by addition of electrons. Some of these activated precursor species then condense on the surface of the substrate to be coated. The ions strike the surface with energies from 10 to 1500 eV. The ion impact energy depends on the electric field between the point of origin of the ion and the sample, and the loss of energy due to collisions which occur between the ion and other ionic or neutral species prior to the impingement of the ion onto the substrate. The neutrals will strike the surface with a variety of energies, from thermal to 100's of eV, depending on the origin of the neutral. This highly energetic deposition process produces highly adherent, very dense and hard coatings on the substrate surface. The density, hardness and other properties of the coating are all very dependent on the energetics of the deposition process as well as the precursor gases used.

The following describes several different forms of the ion beam deposited, abrasion-resistant coating. In the simplest case, the deposition process conditions are not changed during the coating process, resulting in a single layer coating. The thickness of this layer can be from about 50 [Angstrom] to about 100 microns, depending on the degree of abrasion protection required by the application. Generally, thicker coatings provide greater wear and abrasion-resistance. However, thinner coatings may be preferred for coating topographical support members with fine, intricate, or small surface patterns. The thinner coatings cause less alteration to the pattern overall, thereby allowing for the coating of an intricate threedimensional surface pattern without substantially altering the pattern.

In the second case, it is desirable to provide multiple coating layers on a substrate. One example of this situation is the case of a plastic ophthalmic lens with an anti-reflective coating. For this case, a thick, transparent coating is first deposited to provide abrasion resistance. Using the process of the present invention, materials with different indices of retraction are made simply by varying the deposition conditions such as precursor gas composition or ion beam energy. By alternating layers of precise thicknesses and sufficiently different refractive indices on top of the thick layer, an anti-reflective coating is created. The range of suitable layer thicknesses and refractive indices are well known in the prior art. Using the same type of layering of materials with different indices one can design specific reflective colors, e.g. quarter-wave stacks, using techniques that are well known in the prior art.

The third case is applicable in situations where the hard, abrasion-resistant, or low-friction layer does not adhere well to the substrate. In this situation, it is desirable to use a first adhesion-promoting layer or interlayer. Such a layer may utilize different precursor gases or different deposition conditions in order to enhance chemical bonding of the abrasion-resistant, or low-friction layer to the substrate, or to reduce film stress to enhance adhesion to the substrate. Therefore, the first layer must adhere well to the substrate and the subsequent, abrasion-resistant layer must adhere well to the first layer. For this situation, a thin (less than 1 micron) adhesion promoting layer is typically used with a thick (about 2 to about 100 microns) abrasion-resistant outer layer on top.

There are other cases in which a thick, abrasion-resistant layer may adhere well to the- substrate but is lacking in some other property, such as low friction, so that one or more additional top coatings are required. An example of this situation is discussed in Kimock et al., U.S. Pat. No. 5,268,217, for coated wear resistant glass bar-code scanner windows. For this product, a thick, hard, silicon oxy-nitride coating layer material which is abrasion-resistant under most conditions is used. When a piece of glass is rubbed over the silicon oxy-nitride layer, glass debris is left on the surface of the coating due to the high friction between glass and silicon oxy-nitride. If a thin layer of low-friction DLC or other low-friction material is deposited over the silicon-oxy-nitride, rubbing with glass does not leave debris on the surface. The present invention can be used to deposit an adhesion layer, a thick, abrasion-resistant layer, e.g. silicon oxy-nitride, and the low-friction, DLC top layer. Additionally, the DLC could be deposited by other known methods. Finally, other low-friction top layers such as boron nitride, tin oxide, indium tin oxide, aluminum oxide, and zirconium oxide can be used.

DLC is an outstanding abrasion-resistant material. Therefore, for cases where an extremely hard, inert, abrasion-resistant coating is required, DLC is a preferred coating. It has been found that deposition of interlayer materials which contain silicon atoms onto the substrate prior to deposition of the DLC layer results in highly adherent DLC coatings with outstanding wear resistance properties. It is currently believed that reaction between silicon atoms in the interlayer material and the carbon atoms in the DLC layer is critical for the DLC coating to exhibit excellent adhesion. Direct ion beam deposition of interlayers containing silicon and one or more of the elements hydrogen, oxygen, carbon, and nitrogen can be performed by the present invention by operating ion source 4 on gases which contain these elements. For example, ion source 4 can be operated on diethylsilane gas to produce an interlayer containing silicon, carbon, and hydrogen. The thickness of these inter-layers is typically in the range of about 10 [Angstrom] to 1 micron in thickness.

The silicon-containing layers of the present invention, previously referred to, contain the following combinations of elements: Si and C; Si, C and H; Si and N; Si, N and H; Si and O; Si, O and H; Si, O and N; Si, O, N and H; Si, C, H and N; Si, C, H and O; Si, C and N; Si, C and O; Si, O, C and N; and Si, C, H, O and N, may be referred by the names of amorphous silicon carbide, silicon nitride, silicon oxide, and silicon oxy-nitride, and mixtures thereof and chemical combinations thereof, such as "silicon carbonitride", "silicon oxy-carbide", and "silicon oxy-carbonitride". By "silicon carbide", it is meant to include materials which are composed of the elements silicon and carbon, and possibly hydrogen. Stoichiometric and non-stoichiometric amounts of silicon and carbon are included in the definition of this silicon carbide material. By "silicon nitride", it is meant to include materials which are composed of the elements silicon and nitrogen, and possibly hydrogen. Stoichiometric and non-stoichiometric amounts of silicon and nitrogen are included in the definition of this silicon nitride material. By "silicon oxide", it is meant to include materials which are composed of the elements silicon and oxygen, and possibly hydrogen. By "silicon oxy-nitride", it is meant to include materials which are composed of the elements silicon, oxygen, and nitrogen, and possibly hydrogen. Materials falling under the chemical formula $SiO_x N_y H_z$ are considered to be within the definition of this silicon oxy-nitride material. The amorphous silicon oxy-carbide (Si, O, C, H) and silicon oxy-carbonitride (Si, O, C, N, and H) materials deposited by the process of the present invention are particularly advantageous as abrasion-resistant coatings for plastic substrates.

It is advantageous to deposit the DLC layer immediately following the deposition of the adhesion promoting layer to minimize the possibility of recontamination of the interlayer surface with vacuum chamber residual gases or other contaminants. The thickness of the ion beam deposited DLC coating can be between 50 Angstrom and approximately 100 microns. Thinner DLC coatings, on the order of 50 Angstrom are useful when the main function of the DLC is to provide a low friction surface, or chemical protection. Thicker DLC layers are useful when the protection from severe abrasion is required.

Several ion beam deposition methods may be used for the formation of the DLC coatings of the present invention, including direct ion beam deposition, and direct ion beam deposition with ion assist as in U.S. Pat. No. 4,490,229, referred to above, and incorporated herein by reference.

For sake of process simplicity, rapid deposition, and ease of scale-up to mass production, direct ion beam deposition from a hydrocarbon gas source is the most preferred DLC deposition process for this invention Methane or cyclohexane are preferred as the hydrocarbon source gases, but other hydrocarbon gases, such as acetylene, butane, and benzene can be used as well. Hydrogen and inert gases, e.g. argon, krypton, and xenon, may be introduced into the ion source plasma to modify the DLC film properties. The ion energy used in the DLC deposition process may be in the range of approximately 20 eV to approximately 1000 eV. Ion energies in the range of 20 eV to 300 eV are most preferred to minimize heating of the substrate during deposition.

Once the chosen thickness of the top coating layer has been achieved, the deposition process on the substrates is terminated, the vacuum chamber pressure is increased to atmospheric pressure, and the coated substrates are removed from the vacuum chamber. The coated substrates or workpieces may then be used in a process to form nonwoven fabrics or apertured films.

We claim:

1. A topographical support member which is useful for producing nonwoven fabrics or apertured plastic films comprising a rotatable hollow cylindrical tube having a substantially smooth surface and plurality of apertures therethrough, the surface including an ion beam deposited coating over a substantial portion of the surface of the topographical support member, the coating being adherent and exhibiting improved wear resistance relative to uncoated topographical support surfaces, the coating layer being deposited on the support member by a beam of ions containing two or more of the elements of C, Si, H, O, or N.

2. A topographical support member according to claim 1, wherein the rotatable hollow cylindrical tube is formed from a plastic composite material.

* * * * *